United States Patent
Pitault et al.

(10) Patent No.: US 6,592,087 B2
(45) Date of Patent: Jul. 15, 2003

(54) MOUNTING ASSEMBLY FOR DETECTION DEVICE

(75) Inventors: Gerard Pitault, Ruelle (FR); Eugene Cheong, Choa Chu Kang Central (SG)

(73) Assignee: Schneider Electric Industries SA, Rueil-Malmaison (FR)

( * ) Notice: Subject to any disclaimer, the term of this patent is extended or adjusted under 35 U.S.C. 154(b) by 0 days.

(21) Appl. No.: 10/033,895

(22) Filed: Jan. 3, 2002

(65) Prior Publication Data

US 2002/0096618 A1 Jul. 25, 2002

(30) Foreign Application Priority Data

Jan. 19, 2001 (FR) .............................. 01 00964

(51) Int. Cl.$^7$ .................. F16M 11/00; A47B 96/00
(52) U.S. Cl. ............ 248/201; 248/222.11; 248/222.12; 248/310
(58) Field of Search ............... 248/201, 222.11, 248/222.12, 291.1, 289.11, 310, 346.04, 309.1, 176.1

(56) References Cited

U.S. PATENT DOCUMENTS

| | | | |
|---|---|---|---|
| 4,346,274 A | | 8/1982 | Mutschler et al. |
| 5,823,495 A | * | 10/1998 | Joss .................. 248/309.1 |
| 5,928,023 A | * | 7/1999 | Buckner ............ 439/373 |
| 6,029,940 A | | 2/2000 | Klein |
| 6,421,236 B1 | * | 7/2002 | Montoya ............ 361/685 |

FOREIGN PATENT DOCUMENTS

DE            93 10 119.8         10/1993

* cited by examiner

Primary Examiner—Korie Chan
Assistant Examiner—Amy J. Sterling
(74) Attorney, Agent, or Firm—Oblon, Spivak, McClelland, Maier & Neustadt, P.C.

(57) ABSTRACT

A mounting assembly for a detection device is provided with a front detection face, a back face, a first side face and a stop side face opposite to the first side face. The mounting assembly includes a removable mounting part having an attachment plate, a stop lip with a stop member cooperating with corresponding member on the stop side face of the device, a click fit member cooperating with a corresponding member on the first side face of the device and an elastic pressure member pressing on the back of the device. The mounting assembly also includes a fixed mounting part which includes a base plate fixed to a mounting plate, the base plate being designed to hold a removable mounting part and the mounting plate being designed to hold the mounting assembly on an arbitrary support.

20 Claims, 2 Drawing Sheets

MOUNTING ASSEMBLY FOR DETECTION DEVICE

BACKGROUND OF THE INVENTION

1. Field of the Invention

This invention relates to a mounting assembly designed for fast installation and set up of a detection device, particularly such as a position switch, or an inductive, capacitive or optical proximity detector.

2. Discussion of the Background

Some detection devices are composed of an approximately parallelepiped shaped housing comprising a front face that acts as a detection face. These housings are provided with holes so that they can be fixed on an arbitrary support such as the frame of a machine by attachment screws, either directly or, for example, through an attachment bracket. The adjustment of the position of the detection face of this type of device is important because it determines its range and direction. The adjustment must be precise to guarantee that the device is efficient. Therefore, there are means making the adjustment on the support and/or the bracket, usually consisting of oblong attachment holes so that the position of the detection device along at least one axis can be modified before it is finally tightened to prevent it from moving.

Thus, at least part of the adjustment of the detection device with respect to the support and/or the bracket is made at the time that the device is installed. However, for example, when replacing a defective device, with this system it is necessary to restart the adjustment when a new device is put into place, which introduces many disadvantages related to the work time, machine availability, human skills, risk of errors, etc.

Therefore, it would be particularly useful if it were possible to replace one detection device by another, keeping a good attachment but without the need to readjust the position of the new device. It would also be useful to be able to install such a detection device as quickly as possible without needing any special tools.

SUMMARY OF THE INVENTION

This is the purpose of the invention that describes an assembly for the installation of a detection device composed of an approximately parallelepiped shaped housing provided with a front detection face, a back face, a first side face comprising a wire output, a stop side face opposite the first side face and located between two guide side faces. The mounting assembly comprises a removable mounting part that comprises an approximately rectangular attachment plate, a stop lip located on an edge of the attachment plate and comprising stop means capable of cooperating with corresponding means placed on the stop side face of the detection device, click fit means being provided cooperating with the corresponding means located on the first side face of the detection device, and elastic means applying pressure to the back face of the detection device.

According to one characteristic, the removable mounting part stop means comprise one or several elastic tabs cutout in the stop lip and cooperating with one or several corresponding notches positioned on the side stop face of the detection device. The click fit means on the removable mounting part comprise at least one elastic retainer located on an edge of the attachment plate opposite the stop lip, that can be used to lock and release the detection device.

The elastic pressure means on the removable mounting part are composed of at least one spring strip cutout in the attachment plate of the removable mounting part, used to fix the detection device in the locked position and facilitate its ejection in the released position.

According to another characteristic, the mounting assembly also comprises a fixed mounting part composed of a base plate fixed to a mounting plate, the base plate being designed to hold a removable mounting part by means of a mounting part/base plate attachment device and/or to support a detection device by means of several threaded attachment holes, and the mounting plate being designed to fix the mounting assembly on a support.

BRIEF DESCRIPTION OF THE DRAWINGS

Other characteristics and advantages will become clearer in the following description with reference to an embodiment given as an example and represented by the attached drawings on which.

DESCRIPTION OF THE PREFERRED EMBODIMENTS

Figure 1:
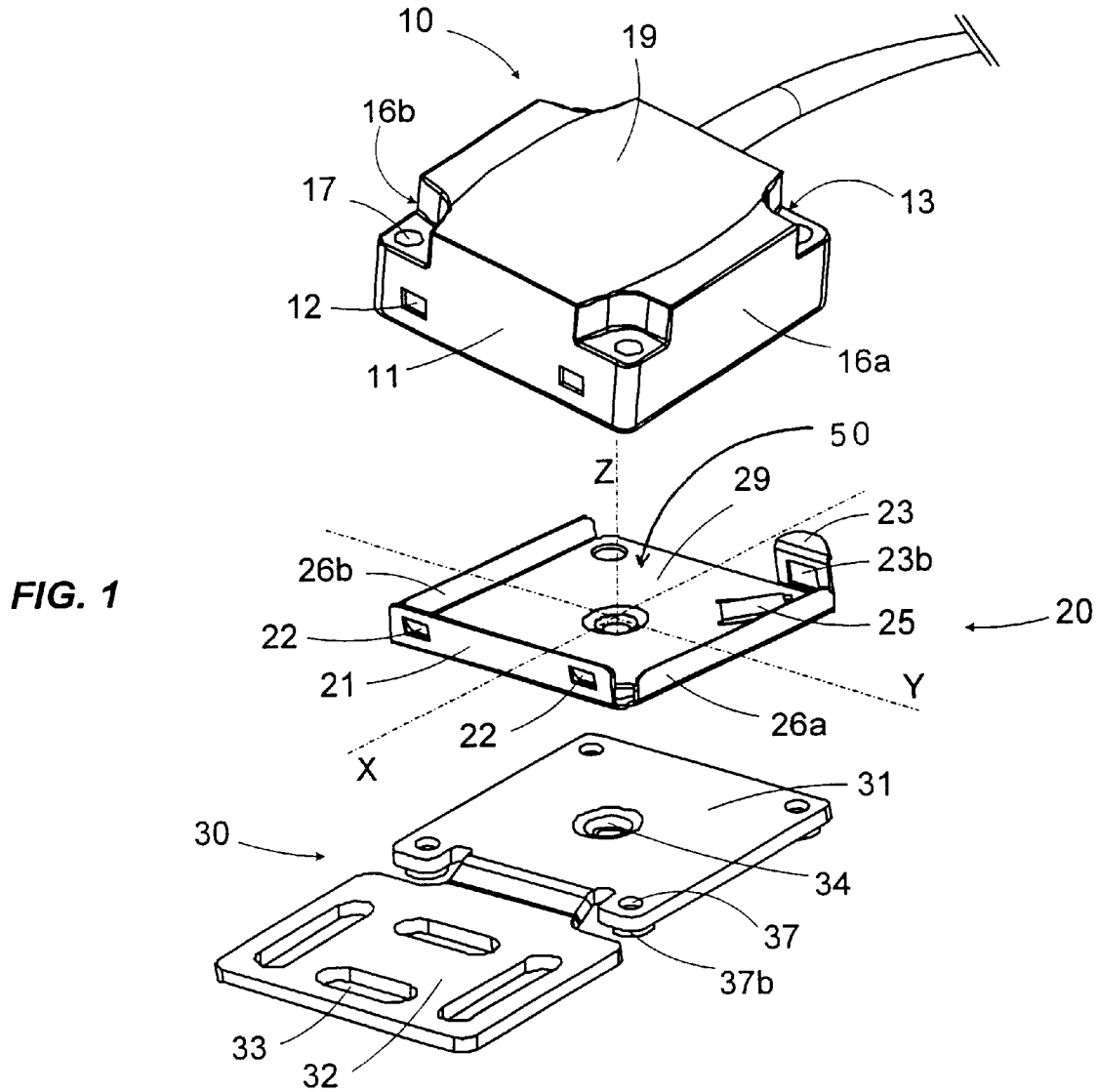
FIG. 1 is a perspective view of an example of a mounting assembly according to the invention with a detection device.

With reference to FIG. 1, a detection device 10 is composed of an approximately parallelepiped shaped housing. This housing has a front detection face 19, a back face and four side faces. These four side faces include a first side face 13 comprising a wire output for an electrical connection of the detection device 10, a stop side face 11 opposite the first side face 13 and two guide side faces 16a, 16b located on each side of the first side face 13.

A mounting assembly composed of a removable mounting part 20 and a fixed mounting part 30 is used to fix this detection device 10 to any support such as a machine frame or any other support. This mounting assembly must be capable of fixing the detection device 10 on the support. It can also be used to adjust its position along at least one direction before tightening. The function of the removable mounting part 20 is to be able to quickly lock and release the detection device 10 on the mounting assembly, so that a device 10 can be changed quickly. The function of the fixed mounting part 30 is to fix the mounting assembly fitted with a device 10, onto any support. Depending on the chosen embodiment, the removable mounting part 20 and the fixed mounting part 30 are composed of two separate parts (see FIGS. 1 to 3) assembled together, or they may be composed of a single attachment part 40 (see FIG. 4).

The removable mounting part 20 comprises:

an approximately rectangular or possibly square attachment plate 29, a stop lip 21 located at one edge of the attachment plate 29 and comprising stop means 22 that can cooperate with corresponding means 12 located on the stop side face 11 on the detection device 10, click fit means 23 that can cooperate with corresponding means located on the first side face 13 on the detection device 10, elastic pressure means 25 applying pressure to the back of the detection device 10, two guide lips 26a, 26b located on each side of the stop lip 21 cooperating with the two guide side faces 16a, 16b respectively of the detection device 10.

Figure 4:
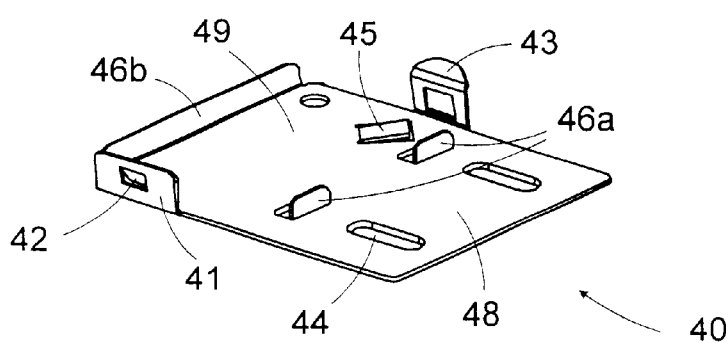
FIG. 4 is another embodiment of a mounting assembly.

The stop means on the removable mounting part 20 comprise one or several elastic tabs 22 cut out in the stop lip 21 (for example two elastic tabs 22 in the preferred embodiment in FIG. 1, one elastic tab 42 in the second embodiment in FIG. 4). When the stop side face 11 of the device 10 is in position in contact with the stop lip 21, the end of the elastic tabs 22 fits into the notches 12 in corresponding locations on the stop side face 11 in order to trap the stop side face 11 in contact with the stop lip 21. This forms a sort of hinge, so that the first side face 13 can be put into position in contact with click fit means 23 in the removable mounting part 20, by applying a slight rotation movement of the device 10.

The click fit means 23 on the removable mounting part 20 comprise at least one elastic retainer 23 located on an edge of the attachment plate 29 opposite the stop lip 21. This elastic retainer 23 is provided with an orifice 23b cutout in the retainer. The elastic retainer 23 is capable of retaining and releasing the detection device 10 by means of the orifice 23b that cooperates with a support pin (not shown in the Figures) located on the first side face 13 of the detection device 10. When the detection device 10 is put into place, the elastic retainer 23 naturally moves away from its normal position until the support pin comes into position in orifice 23b. Once the support pin has come into position, the elastic retainer 23 returns to its normal position thus preventing the detection device 10 from being extracted. The result is that the detection device 10 is fixed on the removable mounting part 20, in combination with the stop means 22. The elastic retainer 23 can then easily be moved outwards either manually or using a tool such as a flat screwdriver or another tool, to release the retaining pin 23b from the orifice and release the device 10.

The elastic means 25 for applying pressure on the removable mounting part 20 are composed of at least one spring strip 25 cutout in the attachment plate 29 of the removable mounting part 20. This spring strip 25 presses in contact with the back of the detection device 10 such that, when the device is in the locked position, the strip fixes the detection device 10 in position along a Z axis perpendicular to the plane of the attachment plate 29, by eliminating clearances firstly between the retaining pin and the orifice 23b, 30 and also between the elastic tabs 22 and notches 12. The spring strip 25 also facilitates ejection of the detection device 10 at the time of releasing, so that the device 10 can very easily be extracted.

The two guide lips 26a, 26b are designed to guide positioning of the detection device 10 along a Y axis (see FIG. 1) and to hold it in place along this axis. In a preferred embodiment shown in FIG. 1, the guide lips 26a, 26b are located on opposite edges of the attachment plate 29 of the removable mounting part 20.

The removable mounting part 20 is preferably made from spring steel with a thickness of the order of 0.5 mm in order to make the spring strip 25 and the elastic retainer 23 elastic. The guide lips 26a, 26b, the stop lip 21 and the elastic retainer 23 are made by a simple bending operation in order to make the simplest and most economic possible removable mounting part 20. The guide lips 26a, 26b, the stop lip 21 and the elastic retainer 23 are facing the same direction approximately perpendicular to the plane of the attachment plate 29. However, the angle between the elastic retainer 23 and the attachment plate 29 is slightly less than 90° to contribute to clamping the detection device 10 in position along an X axis perpendicular to the Y and Z axes. The elastic tab(s) 22, the spring strip 25 and the guide openings 46a are pushed out by cutting operations.

Thus, the removable mounting part 20 can be used firstly to efficiently hold a detection device 10 in the three directions: along the X axis by means of the side lip 21 and the elastic retainer 23, along the Y axis due to the guide lips 26a, 26b that improve lateral support, and along the Z axis by means of the elastic tabs 22, the elastic retainer 23 and the spring strip 25. It also makes it easy to retain a detection device 10 without tools and to release it using an ordinary tool such as a flat screwdriver.

Figure 2:
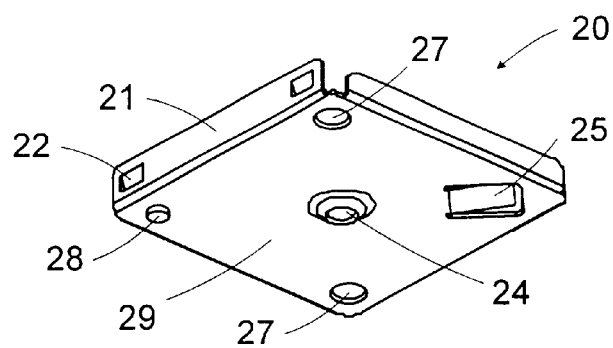
FIG. 2 is another perspective view of a removable mounting part.
Figure 3:
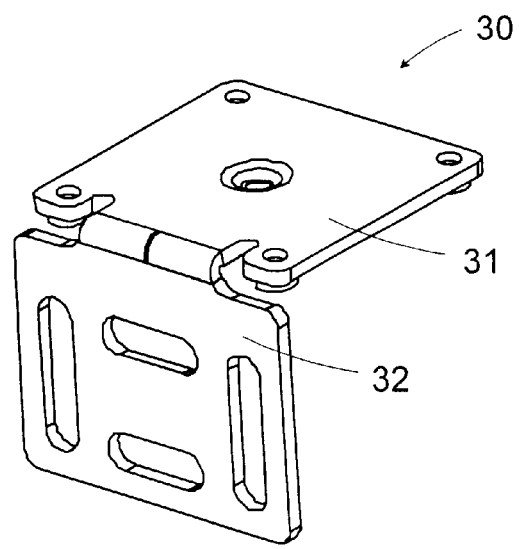
FIG. 3 shows an alternative of a fixed 30 mounting part.

In a preferred embodiment shown in FIGS. 1 to 3, the fixed mounting part 30 comprises two parts—an approximately rectangular or square shaped base plate 31 fixed to a mounting plate 32. The mounting plate 32 has oblong holes 33 that are used to fix and attach a mounting assembly on an arbitrary support in a known manner. The base plate 31 is designed to receive the removable mounting part 20 by means of a removable mounting part/base plate attachment device 50 described below. The base plate 31 thus holds a detection device 10 directly through several threaded attachment holes 37 in the base plate 31; for example FIGS. 1 and 3 show four threaded attachment holes 37 located at the four ends of the base plate 31.

The removable mounting part/base plate attachment device comprises a threaded conical hole 34 located at the center of the base plate 31 cooperating with a conical hole 24 at the center of the attachment plate 29 of the removable mounting part 20, and a positioning pin 28 for the attachment plate 29 cooperating with one or several threaded attachment holes 37 in base plate 31. The removable mounting part 20 may be fitted onto base plate 31 using a central screw with a countersunk head inserted in the conical hole 24 and screwed into the threaded conical hole 34. The rigidity of this attachment can be improved by fixing the positioning pin 28 in one of the four holes 37, thus preventing any unwanted rotation of the removable mounting part 20 relative to the base plate 31. Thus, if the removable mounting part 20 and the base plate 31 are square, there are four possible positions of the removable mounting part 20 at 90° intervals from each other, corresponding to the positioning pin 28 fitting in one of the four threaded attachment holes 37.

This mounting assembly can also be used to screw a detection device 10 onto base plate 31 directly without using the removable mounting part 20. Detection devices 10 usually comprise four holes 17, at the positions corresponding to the four threaded attachment holes 37. Four screws can then be inserted so that they can be screwed into the tapped thread 37b (see FIG. 1) of the threaded attachment holes 37. The tapped thread 37b is done by pushing a cutout in base plate 31.

Thus, this invention has the additional advantage that a mounting assembly like that described previously can be used for direct attachment of a detection device on the mounting assembly, without the need for the use of a removable mounting part, which is still required in some applications. In this case, replacing one detection device by another does not modify the adjustment of the mounting assembly on the support, since the assembly plate 32 is not modified.

The fixed mounting part 30 is preferably made from approximately 2 mm thick steel, to give sufficient stiffness to effectively immobilize the detection device 10 on the support. Therefore, it is not useful to use the same material for the removable mounting part 20 and the fixed mounting part 30. Detection devices 10 used with a mounting assembly like that described above are usually heavier than 20 grams, for example about 50 grams with dimensions of the order of 40×40×15 mm. In FIG. 1, the base plate 31 and the mounting plate 32 are in two parallel planes and the plane of the mounting plate 32 is slightly offset from the plane of the base plate 31 in order to compensate for the thickness generated by the tapped threads 37b and the threaded conical hole 34. In an equivalent alternative diagrammatically shown in FIG. 3, the base plate 31 and the mounting plate 32 are in two orthogonal planes, the fixed mounting part thus forming a square bracket.

A second embodiment of the invention shown diagrammatically in FIG. 4 is particularly applicable for compact and lightweight detection devices 10. This is why the mounting assembly then comprises a removable mounting part and a fixed mounting part forming a single attachment part 40 for retaining and releasing a detection device 10 and for adjustment and attachment of the mounting assembly on an arbitrary support. Due to the low weight of small detection devices 10 (in general, this second embodiment applies to detection devices with a mass equal to or less than 10 grams, for example with dimensions of the order of 8×20×8 m), and this attachment part 40 can then be made from the same type of spring steel as the removable mounting part 20.

The removable mounting part for this attachment part 40 comprises a base plate 49, a stop lip 41 fitted with an elastic tab 42, an elastic retainer 43, a spring strip 45 and two guide lips 46a, 46b. The functions performed by the stop lip 41, the elastic tab 42, the elastic retainer 43, the spring strip 45 and the two guide lips 46a, 46b are similar to the functions performed by the stop lip 21, the elastic tabs 22, the elastic retainer 23, the spring strip 25 and the guide lips 26a, 26b respectively. At least one of the guide lips 46a, 46b is composed of one or several openings 46a cut out in the base plate 49. The base plate 49 is prolonged by an fixed mounting part 48 that comprises oblong attachment holes 44 that can be used to adjust the position of the attachment part 40 and to fix the mounting assembly on a support.

Obviously, it would be possible to imagine other alternatives and improvements to detail, or even to envisage the use of equivalent means, without going outside the framework of the invention.

What is claimed is:

1. Mounting assembly for a detection device having a substantially parallelepiped shaped housing provided with a front detection face, a back face, a first side face comprising a wire output, a stop side face opposite the first side face located between two guide side faces, wherein the mounting assembly comprises a removable mounting part which comprises:

an approximately rectangular attachment plate,
   a stop lip located on an edge of the attachment plate and comprising stop means for cooperating with a corresponding means positioned on the stop side face of the detection device,
   click fit means for cooperating with said corresponding means located on the first side face of the detection device, and
   elastic pressure means pressing on the back face of the detection device.

2. Mounting assembly according to claim 1, wherein the stop means of the removable mounting part comprise at least one elastic tab cutout in the stop lip and cooperating with at least one corresponding notch located on the stop side face of the detection device.

3. Mounting assembly according to claim 1, wherein the click fit means of the removable mounting part comprise at least one elastic retainer located on an edge of the attachment plate opposite the stop lip for retaining and releasing the detection device.

4. Mounting assembly according to claim 3, wherein the elastic pressure means of the removable mounting part comprise at least one spring strip cut out in the attachment plate of the removable mounting part, used to fix the detection device in the retained position and to facilitate ejection thereof in the released position.

5. Mounting assembly according to one of claims 1–4, wherein the removable mounting part also comprises two guide lips located on each side of the stop lip, cooperating with the two guide side faces respectively of the detection device.

6. Mounting assembly according to claim 5, wherein the guide lips are positioned on opposite edges of the attachment plate of the removable mounting part.

7. Mounting assembly according to claim 5, which comprises at least one guide lip formed from one or several openings cut out in the base plate.

8. Mounting assembly according to claim 1, which comprises a fixed mounting part which includes a base plate fixed to a mounting plate, the base plate being designed to hold a removable mounting part by a removable mounting part/base plate attachment device and to support a detection device using the several threaded attachment holes, and the mounting plate being designed to fix the mounting assembly onto a support.

9. Mounting assembly according to claim 8, wherein the removable mounting part/base plate attachment device comprises a conical threaded hole in the base plate cooperating with a conical hole in the attachment plate of the removable mounting part, and a positioning pin for the attachment plate cooperating with one of the threaded attachment holes of the base plate.

10. Mounting assembly according to claim 1, wherein the base plate is prolonged by a fixed mounting part for fixing the mounting assembly on a support.

11. Mounting assembly for a detection device having a substantially parallelepiped shaped housing provided with a front detection face, a back face, a first side face comprising a wire output, a stop side face opposite the first side face located between two guide side faces, wherein the mounting assembly comprises a removable mounting part which comprises:

an approximately rectangular attachment plate,
   a stop lip located on an edge of the attachment plate and comprising stop members for cooperating with a corresponding members positioned on the stop side face of the detection device,
   a click fit member for cooperating with said corresponding members located on the first side face of the detection device, and
   an elastic pressure member pressing on the back face of the detection device.

12. Mounting assembly according to claim 11, wherein the stop member of the removable mounting part comprises at least one elastic tab cutout in the stop lip and cooperating with at least one notch located on the stop side face of the detection device.

13. Mounting assembly according to claim 11, wherein the click fit member of the removable mounting part comprise at least an elastic retainer located on an edge of the attachment plate opposite the stop lip for retaining and releasing the detection device.

14. Mounting assembly according to claim 13, wherein the elastic pressure member of the removable mounting part comprise at least one spring strip cut out in the attachment plate of the removable mounting part, used to fix the detection device in the retained position and to facilitate ejection thereof in the released position.

15. Mounting assembly according to one of claims 11–14, wherein the removable mounting part also comprises two guide lips located on each side of the stop lip, cooperating with the two guide side faces respectively of the detection device.

16. Mounting assembly according to claim 15, wherein the guide lips are positioned on opposite edges of the attachment plate of the removable mounting part.

17. Mounting assembly according to claim 15, which comprises at least one guide lip formed from one or several openings cut out in the base plate.

18. Mounting assembly according to claim 11, which comprises a fixed mounting part which includes a base plate fixed to a mounting plate, the base plate being designed to hold a removable mounting part by a removable mounting part/base plate attachment device and to support a detection device using the several threaded attachment holes, and the mounting plate being designed to fix the mounting assembly onto a support.

19. Mounting assembly according to claim 18, wherein the removable mounting part/base plate attachment device comprises a conical threaded hole in the base plate cooperating with a conical hole in the attachment plate of the removable mounting part, and a positioning pin for the attachment plate cooperating with one of the threaded attachment holes of the base plate.

20. Mounting assembly according to claim 11, wherein the base plate is prolonged by a fixed mounting part for fixing the mounting assembly on a support.

* * * * *